Aug. 1, 1950     H. A. HOLMES     2,517,316
TIME-INTERVAL AND SEQUENCE RECORDER
Filed March 6, 1946                                2 Sheets-Sheet 2

DIRECTION OF TRAVEL OF RECORD SHEETS

Fig. 4

Inventor
Howard A. Holmes
By Walter W. Burns
Attorney

Patented Aug. 1, 1950

2,517,316

UNITED STATES PATENT OFFICE 2,517,316

TIME-INTERVAL AND SEQUENCE RECORDER

Howard A. Holmes, Fairmont, W. Va.

Application March 6, 1946, Serial No. 652,330

20 Claims. (Cl. 346—33)

1

This invention relates to recording devices and has particular relation to those instruments wherein a record of functions of machines and mechanisms are instantly and permanently recorded.

The primary object of the invention is the provision of an improved time recording instrument of varied adaptability.

Another object of this invention is the provision of a recording instrument which may be utilized for example to record the date, time and split second time of the operation of a circuit breaker and its return to operative condition.

Still another object of the invention is the provision of a recording instrument which may be utilized to record operations of related devices showing the relation between similar or dissimilar operations in such a manner that the comparative times of operation and their relation will be apparent from an inspection of the record.

Still another object of the invention is the provision of a recording instrument which may be utilized to record the operations of a machine, mechanism or device and which is provided with a time-stamp for recording the starting and stopping times during long intervals and an additional recording device for concurrently recording short intervals of time, thus making it unnecessary to run a record sheet continuously for a long interval of operation, or non-operation, of the machine, mechanism or device, a record of whose operation is being recorded.

Referring to the drawing wherein is illustrated one embodiment of the invention.

Throughout the drawing and specification, the same reference characters refer to the same or similar parts.

Figure 1:
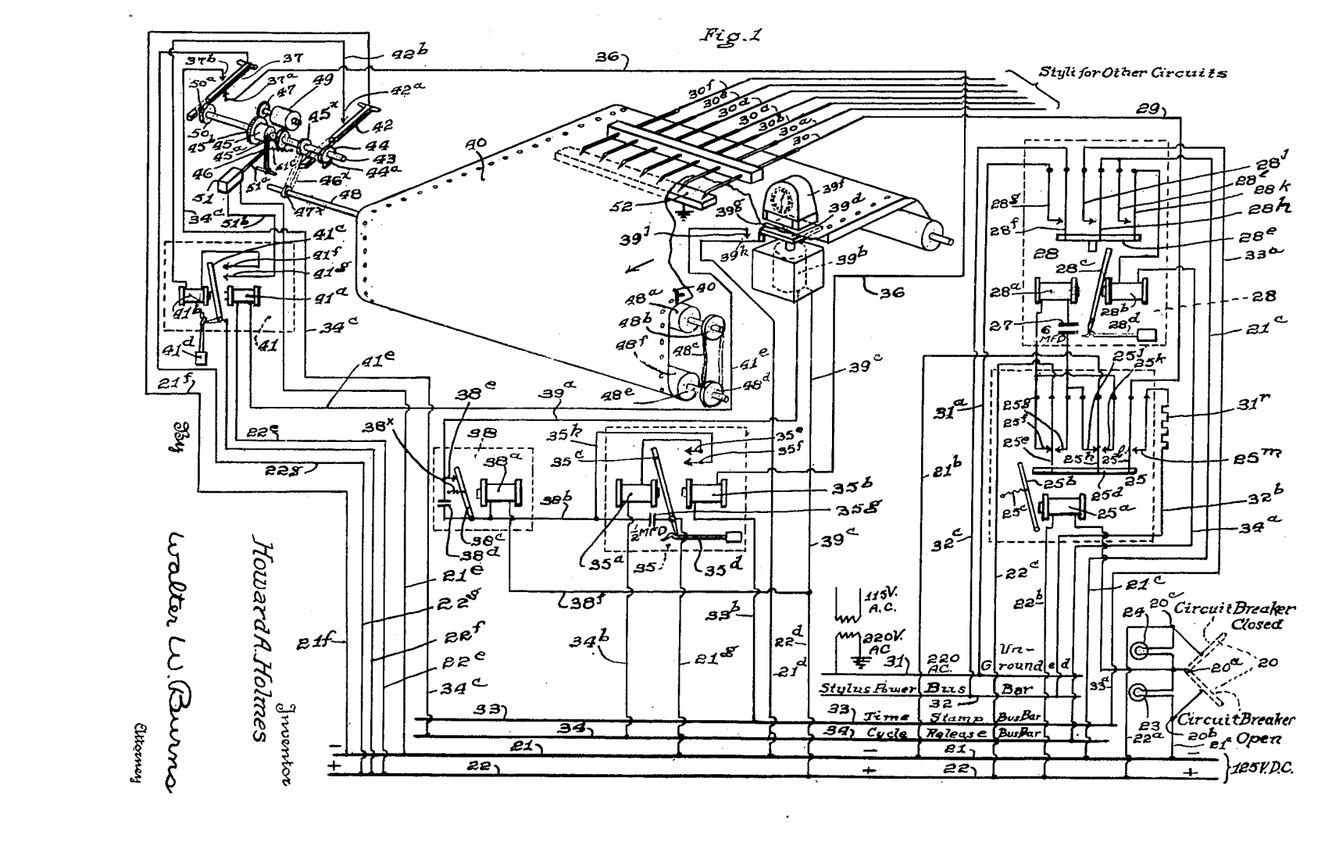
Fig. 1 is a diagrammatic illustration showing a lay-out and one circuit for the operation of the invention.

In the particular modification illustrated and described in Fig. 1, a lay-out is shown for recording the operation of a series of circuit breakers, only one complete circuit being included. The addition of other circuits will be fully understood by those skilled in the art after a reading of the specification in connection with the drawing.

In the drawing, the numeral 20 designates the

2 switch which is indicated in dotted lines to show its connection from the switch point 20a to either one of the contact points 20b or 20c. It is to be understood that the operation of the switch 20 connects the point 20a with the point 20c when the circuit breaker is closed and connects the point 20a with the point 20b when the circuit breaker is open. It is to be further understood that the circuit breaker operates the switch 20 and except for the instant when a change is taking place, the switch 20 connects the contact point 20a with either the contact point 20b or the contact point 20c, but never connects 20a with both contacts 20b and 20c at the same time.

Across the points 20a, 20b there is connected a red signal lamp 23, and across the points 20a, 20c is connected a green signal lamp 24. These lamps 23, 24 are located at a place on the switch board where they may be plainly seen. The contact point 20a is connected through the lamp 23 and the point 20b to the negative (—) side 21 of a source of direct current, by means of the conductor 21a and the point 20a is connected through the lamp 24 and the contact point 20c to the positive (+) side 22 of the same source of direct current by the conductor 22a. The point 20a is also connected continuously with the positive (+) side 22 of the direct current supply by means of the conductor 22b, through the coil 25a of the relay 25. The relay 25 illustrated at the right side of Fig. 1 includes a coil 25a having an armature 25b, which is normally held away from the core of the coil 25a by the spring 25c. A non-conducting operating rod or connection 25d is in position to be operated by the armature 25b. The operating rod or connection 25d is supported by three resilient contacting members which are designated respectively, 25e 25h and 25l. The contact member 25e normally contacts the coacting contact member 25f when the coil 25a is not energized and when the coil 25a is energized, the contact between the contact members 25e and 25f is broken and contact is at once made by the contact member 25e with the contact member 25g.

The contact member 25h is normally in contact with the contact member 25j when the coil 25a is not energized, but when the latter is energized, contact with the contact member 25j is broken and contact is at once made between the contact member 25h and the contact member 25k.

The resilient contact member 25l is normally out of contact with any coacting contact member when the coil 25a is not energized, but when the latter is energized, contact is at once made with the contact member 25m.

The results of the operation of the armature 25b by making and breaking of contact between the above-described contact members will be later described. It is to be understood that there is one relay unit 25 for each switch 20 and each circuit breaker or other unit, the operations of which are to be recorded.

The connections for the contacting members of the relay 25 will now be set forth. The contact member 25f is connected to a coil 28a of the relay 28, the other end of the coil 28a being connected through a condenser 27 to the contact member 25g and the contact member 25j. It is to be noted that the contact member 25f is connected to the contact member 25k and the contact member 25g is connected to the contact member 25j. The capacity of the condenser 27 would depend upon the characteristics of the relay coil 28a. It is thus clear that the result of the operation of the bar 25d is the reversal of the potential at the terminals of the condenser 27 and the impulse energization of the coil 28a.

The contact member 25e is connected through the conductor 22c to the positive (+) side 22 of the direct current line. The contact member 25h is connected through the conductor 21b to the negative (—) side 21 of the direct current line. The contact member 25l is connected to the stylus 30 by means of the conductor 29 and its coacting contact member 25m is connected through the 12,000 ohm resistor 31r and the conductor 32b to the stylus power bus bar 32.

In the construction illustrated, the contact members 25e, 25h and 25l are of resilient material which normally holds them, respectively, in contact with the contact members 25f, 25j and out of contact with contact members 25g, 25k, and 25m, until the coil 25a is energized.

The relay 28 has two electro-magnetic coils 28a, 28b, and an armature 28c which is moved in opposite directions by the respective coils 28a and 28b. A spring retainer 28d is in position to hold the armature 28c in either one of its limits of position until such time as one of the coils moves it to its other position, in a well-known manner. A non-conducting member operating rod 28e is provided in position to be operated by the armature 28c when the coil 28a is energized. Connected to the operating rod 28e are three resilient contact members 28f, 28h and 28k. These contact members 28f, 28h and 28k are in position to contact, but are normally out of contact with the contact members 28g, 28j and 28l. When the armature 28c is operated by the coil 28a, the above mentioned contact members 28f, 28h and 28k close contact with their respective contact members, the armature 28c being held in this position by the retainer 28d. When the coil 28b is energized, the retaining action of the retainer 28d is overcome and the resilience of the spring contact members 28f, 28h and 28k will return them to the positions shown in Fig. 1.

The conductors from the contact members of the relay 28 will now be described. The contact member 28f is connected through the conductor 32c to the stylus bus bar 32. Its coacting contact member 28g is connected through the conductor 31a to the 220 volt alternating current ungrounded conductor 31. From this it appears that, since contacts 25m and 25l have already been closed, a circuit has been established from the ungrounded 220 volt A. C. bus bar 31, through conductor 31a, contacts 28g, 28f, conductor 32c, stylus bus bar 32, conductor 32b, resistor 31r, contacts 25m and 25l, conductor 29, stylus 30, record sheet 40, ground plate 52, to the grounded side of the 220 volt A. C. power.

The resilient contact member 28h is connected through the conductor 21c to the negative (—) side 21 of the direct current line. The contact member 28l is also connected through the conductor 21c to the same line conductor 21. The contact member 28j is connected through the conductor 33a to the time stamp bus bar 33. The resilient contact member 28k is connected through the relay coil 28b and the conductor 34a to the cycle release bus bar 34.

The connections to the relay 35 and its construction will now be described. This relay 35 has two operating coils 35a and 35b. The armature 35c is operated alternately and in opposite directions by the respective coils 35a and 35b and is provided with a resilient retaining member 35d which holds the armature 35c in the position to which it has been moved until the other coil is energized in a manner already described for its counterpart 28d.

The relay 35 is provided with two contact members 35e and 35f, the armature 35c itself also acting as a conductor. The coil 35a is connected at one end through the conductor 34b to the cycle release bus bar 34. Its other end is connected to the contact member 35e. The coil 35b has one end connected through the conductor 33b to the time stamp bus bar 33. Its other end is connected through the conductor 36 to the contacting member 37a for normal contact with the pivoted contact member 37. The armature 35c is connected through a condenser 35g and a conductor 35h to the contact member 35f.

Contact member 35f is connected to time stamp relay coil 38a and relay armature 38c by a conductor 38b. Condenser 35g is connected on one side to relay armature 35c and on the other side to the conductor 38b, thereby producing a set of connections in which the condenser 35g is short-circuited through the conductor 35h when the arm 35c is in its position of contact with the contact element 35f. Condenser 38d is connected with armature 38c to contact member 38e. Relay armature 38c is normally held in contact with contact 38e by a spring 38X, when relay coil 38a is deenergized.

The condenser 38d and the condenser 35g are provided merely for spark suppression.

One conductor 39a from the platen solenoid coil 39b of the time stamp, is connected to the contact member 38e. The other ends of the respective coils 38a and 39b are connected together by the conductor 38f and 39c and the joined ends are connected by the conductor 22d to the positive (+) side of the direct current line. The solenoid coil 39b operates a platen 39d in a position immediately below the record sheet 40 and opposite the line of styli, 30, 30a, 30b, 30c, 30d, 30e and 30f provided for the respective units, the operations of which are being recorded.

Above the sheet 40 and in a position above the platen 39d is a time recording stamp clock 39f. The printing ribbon 39g is located between the type of the clock 39f and the record sheet 40, so that when the solenoid coil 39b operates the platen 39d against the record sheet 40, the printing ribbon 39g will print the time on the record sheet 40, in accordance with the setting of the clock type at the instant of operation of the platen 39d.

The construction of the means for operation of the record sheet 40 will now be described.

In position to be operated when the platen 39d is moved by the solenoid coil 39b, is a spring contact member 39h. Coacting with the contact member 39h and normally out of contact therewith, is a contact member 39j. The contact member 39h is connected by the conductor 21d to the negative (—) side 21 of the direct current line. The contact member 39j is connected by the conductor 41e to a relay coil 41a of the relay 41. The other end of the coil 41a is connected through the conductor 22e to the positive (+) side 22 of the direct current line.

The coil 41a and a second similar coil 41b operate in alternate opposite directions on the armature 41c. This armature 41c has a spring retainer 41d, similar in construction and operation to the retainers 25d and 35d already described. The armature 41c is connected through the conductor 22f to the positive (+) side of the direct current line.

One end of the coil 41b is connected to a contact member 41f and its other end is connected to a contact member 42a in position to contact the pivoted contact member 42 when the latter swings upwardly as will be later described. This swinging contact member 42 is connected through the conductor 21f to the negative (—) side 21 of the direct current line. A suitable shaft 43 is suitably journaled and carries a disk 44 having a lifting lug 44a on its periphery. This lifting lug 44a is in position to raise and lower the pivoted contact member 42 as the lug 44a comes in contact therewith. This latter action closes and opens contacts between the contact member 42a and the coacting contact member 42. It should be noted that the lug 44a is located so that the contact members 42 and 42a are closed and opened when shaft 43 has made about one half of its revolution.

The shaft 43 carries a sprocket 46x which is connected by a chain 46x to a sprocket 47x on a shaft 48 through a friction device so that the record sheet can be moved by hand to register with the styli. Mounted on a shaft 48 is a roller 48a. This shaft 48 also carries a pulley 48b which operates a drive belt 48c to a similar but preferably a slightly smaller pulley 48d. This pulley 48d is mounted on a shaft 48e upon which is a take-up roller 48f for receiving the used end of the record sheet 40.

On the shaft 43 is mounted a one-revolution clutch 45 having a stop lug 45a. This lug 45a is in position to be engaged by a swinging stop-arm 46. Integral with the continuously operating member of the one-revolution clutch 45 is a gear 45b which is coactively engaged by a gear 47 driven continuously by a power motor 49.

Also mounted on the shaft 43 is a disk 50 having a lug 50a in position to lift and lower the swinging contact member 37 already described. The contact members 37 and 37a are normally in contact but as the shaft 43 revolves and a lug 50a lifts one end of the swinging contact member 37, the contact 37a is broken and the contact member 37 is moved into contact with the contact member 37b.

The lug 50a is so positioned on its disk 50 that contact between the contact members 37 and 37a is broken and immediately contact is made and again broken between the contact members 37 and 37b, followed immediately by the restoration of contact between the contact members 37 and 37a—all immediately prior to the stopping of the turning of the shaft 43 by the operating of the one-revolution clutch 45. The contact member 37b is connected through the conductor 34c to the cycle release bus bar 34. As the lifting lug 50a passes and permits the swinging contact member 37 to lower, the contact between the latter and the contact member 37b is broken. It is to be noted that the swinging contact member 37 is connected through the conductor 22g to the positive (+) side 22 of the direct current line.

Connected to the swinging stop member 46 is a rod 51a which is operated by the solenoid coil 51 to disengage the upper end of the swinging stop member 46 from the lug 45a of the one-revolution clutch 45. The rod 51a is returned to position shown in Fig. 1 when solenoid coil 51 is deenergized by a spring 51c.

The solenoid coil 51 has one end connected to the contact member 41g of the relay 41 by the wire 51b and the other end through the conductor 21e to the negative (—) side of the direct current line.

It is to be noted that the styli above the record sheet 40 are provided with a coacting grounded bar or plate 52 below the record sheet.

The several component parts of the structures and circuits diagramatically set forth in Fig. 1 having been described, the operation of the whole will now be set forth.

Assuming the parts and circuits to be as illustrated in Fig. 1, with the parts in normal operation with the circuit breaker closed and connected to the present invention and ready to coact therewith, the lamp 23 will be lighted and the lamp 24 will be shunted out. As the circuit breaker opens, the switch 20 will break contact between contact members 20a and 20c and establish contact between the contact members 20a and 20b. The lamp 24 will light and the lamp 23 will be extinguished. This action places the relay coil 25a across the direct current circuit and the armature 25b is drawn to the right. This armature action moves the rod 25d to the right. At once, the connection between the stylus power bus bar is established through the bus bar 32, the conductor 32b, the resistor 31r, the contact member 25m, 25l, and through the conductor 29 to the stylus 30. The grounded plate 52 for coaction with the stylus has already been described.

The movement of the armature 25b and its coacting rod 25d opens a circuit, at the contacts 25e and 25f from the positive (+) line 22 to the condenser 27, which is normally charged by the D. C. supply voltage, thus maintaining the relay coil 28a de-energized. The movement of the armature 25b and its co-acting rod 25d, also connects a second charging circuit to the condenser 27 at which time the relay coil 28a is momentarily energized and the armature 28c is drawn to the coil 28a.

It should be noted that when the condenser 27 is fully charged, the entire voltage of the direct current line appears across the condenser terminals, but no current flows through the condenser. Under these conditions, the relay coil 28a is de-energized but in condition to act on reversal of the potential at the condenser terminals. When, on energization of the relay coil 25a and movement of the armature 25b, the potential at the terminals of the condenser 27 is reversed, the relay coil 28a will be energized and the armature 28c will be drawn toward the coil 28a. The retaining member 28d holds the armature in this position until coil 28b draws it to its normal position as will later appear. Summarizing, the function of the relay 25 is to (1) place the stylus bus bar in connection with the stylus corresponding to the circuit breaker which has just operated and (2) to operate the coil 28a of the relay 28 for the purposes which will presently be made plain.

Returning to the relay 28 and the movement of the armature 28c to the left, the bar or rod 28e moves also to the left and is locked in position as already pointed out, by arm 28c through the action of the retaining member 28d. This action closes the circuit from the stylus power bus bar 32, through the conductor 32c, the contact members 28f, 28g and the conductor 31a to the 220 volt alternating current bus bar 31. Since as already pointed out, the stylus 30 has been connected to the stylus power bus bar 32, the connection of the bus bar 32 to the alternating current bus bar 31, places the 220 volt alternating current on the stylus 30, and since the alternating current line 31 is grounded, through the secondary coil of the transformer, as shown, as is also the plate 52 beneath the stylus 30, it follows that the current will pass through the conducting teledeltos chart between the stylus 30 and the grounded plate 52 as long as these two coacting circuits are connected. The chart or record sheet 40 which is between the stylus 30 and the grounded plate 52 will receive the current which will pass each time the current reverses its direction—with the 60 cycle current it being 120 times per second. The record sheet itself is of a type which will indicate by a small dot, each time the current passes. This type of record sheet is well known in the arts and for this reason will not be further described. As the record sheet moves while the stylus carries the 220 volts, alternating current, as will later be described, it follows that by counting the number of dots made on the record sheet, or observing the length of the dotted line, the time the circuit breaker is out will be indicated, provided the record sheet moves continuously during the whole time.

The operation of the relay 28 by its coil 28a, produces further action. The action of the movement of the bar 28e to the left, bringing the contact members 28h and 28j together, completes a circuit as follows: From the negative (—) side 21 of the direct current line 21, through the conductor 21c, the contact members 28h, 28j, through the conductor 33a, the time stamp bus bar 33, the conductor 33b, the coil 35b of the relay 35, the conductor 36, the contact members 37a, 37, the conductor 22g to the positive (+) side 22 of the direct current line, thus completing the circuit.

The energization of the coil 35b moves the armature 35c to the right where it is retained by the retainer 35d until the coil 35a is energized to move it in the opposite direction. This movement of the armature 35c to the right completes the following circuit: from the negative (—) side 21 of the direct current line by the conductor 21g through the armature 35c, the contact member 35f, the conductor 35h, the conductor 38b, the armature 38c, the contact member 38e, the conductor 39a, the time stamp coil 39b, the conductor 39c to the positive (+) side 22 of the direct current line. This operates the time stamp platen 39d to record the time on the upper surface of the record sheet 40, the details of which have already been described. A branch circuit from the conductor 38b through the delayed action time stamp relay coil 38a, the conductors 38f and 22d to the positive side (+) 22 energizes the delayed action coil 38a to break the circuit just described, at 39e, in order to return the platen 39d from its stamping position. The complete stroke and return of the platen is extremely fast. However this return of the platen does not return the armature 35c which is retained in its right hand position to the retainer member 35d. The movement of the armature 35c to the right also made a preparatory setting of the later cycle release by connecting the negative (—) side 21 of the direct current line through the conductor 21g, the armature 35c, the contact member 35e, the relay coil 35a and the conductor 34b to the cycle release bus bar 34, which latter at this time is not energized. It will be noted that the coil 38a will be kept energized until such time as the armature 35c is moved to the left by energization of magnet 35a which moves the armature 35c, thus breaking the circuit to the coil 38a at the contact 35f. When the coil 38a is deenergized, the spring 38X pulls the armature 38c into contact with the contact member 38e.

It will be recalled that the coil 41a is connected by the conductor 22e to the positive side 22 of the direct current line and that a normally open circuit is connected to the other side of the coil 41a through the conductor 41e, the open contact member 39j, the spring contact member 39h (held out of contact by the platen 39d), through the conductor 21d to negative (—) side 21 of the direct current line.

As the platen 39d is raised, the spring contact member 39h contacts the contact member 39j and immediately thereafter separates, with the result that momentary energization of the coil 41a takes place. This causes movement of the armature 41c to the right where it is held by spring retainer 41d, causing the armature 41c, which is connected to the positive (+) side 22 of the direct current line, to contact with the contact members 41f and 41g. The contact of the armature 41c with the contact member 41f, establishes a preparatory, and open, circuit as follows: from the negative (—) side 21 of the direct current line, through the conductor 21f, the swinging contact member 42, the normally open contact member 42a, the conductor 42b, the coil 41b, the contact member 41f, the armature 41c, and the conductor 22f to the positive (+) side 22 of the direct current line. As this circuit is open at the contact member 42a, the coil 41b is at this time not energized. However the closing of the contact 41g with the armature 41c completed the connection to the solenoid 51 as follows: from the negative (—) side 21 of the direct current line, through the conductor 21e, the solenoid 51, the conductor 51b, the contact member 41g the armature 41c and the conductor 22f to the positive (+) side 22 of the direct current line.

Energization of the solenoid 51 exerts a pull on its rod 51a which causes a withdrawal of the upper end of the swinging stop member 46 with the resultant release of the lug 45a of the one-revolution clutch 45 permitting it to engage. But since the gear 47 is continuously driven by the motor 49 and in turn continuously drives the gear 45b of the one-revolution clutch 45, it follows that the shaft 43 will be at once put in motion. This causes the roller 48a to feed the record sheet 49, which will continue for one second, or such time as may be predetermined, at the end of which time, the movement of the record sheet will be stopped as to be presently described.

As the shaft 43 revolves counter-clockwise as shown in Fig. 1, the lifting lugs 44a and 50a are carried around for one full revolution—until the stop lug 45a engages the top of the swinging stop member 46, when the one-revolution clutch will be disengaged and the movement of the shaft 43 stopped. When shaft 43 has made about one-half revolution the lifting lug 44a lifts the swinging member 42, a momentary circuit is completed as follows: from the negative (—) side 21 of the direct current line, through the conductor 21f, the swinging contact member 42, the contact member 42a, the conductor 42b, the coil 41b, the contact member 41f, the armature 41c and the conductor 22f to the positive (+) side of the direct current line. This energization of the coil 41b moves the armature 41c to the left, thus breaking the connection between the armature 41c and the contact member 41g. Since the energization of the solenoid 51 is thus destroyed, the latter will permit the swinging stop member 46 to return to its normal position to intercept the stop-lug 45a on the completion of its one revolution—to thus stop the shaft 43 from revolving. In addition, the movement of the armature 41c to the left, breaks connection between the armature 41c and the contact member 41f, thus de-energizing the relay coil 41b which caused the movement. The retaining member 41d operates to hold the armature 41c in this left position until again operated by the coil 41a.

Also continued revolution of shaft 43 moves the lifting lug 44a past the swinging member 42, breaking the connection at contact members 42 and 42a.

Another result of the rotation of the shaft 43 is that just before the revolution is completed, the lifting lug 50a raises the swinging contact member 37, breaking its contact with the contact member 37a and closing the contact with the contact member 37b for a short interval after which contact with 37b is broken and contact between 37 and 37a again made just as shaft 43 stops rotating. The breaking of the contact between the swinging contact member 37 and the contact member 37a, de-energizes the coil 35b to which the latter is connected by the conductor 36. While the coil 35b is so de-energized, contact is made between the swinging contact member 37 and the contact member 37b, which completes the circuit from the cycle release bus bar as follows: from the cycle release bus bar 34 through the conductor 34c, the contact member 37b, the swinging contact 37, the conductor 22g to the positive (+) side 22 of the direct current line.

It has already been pointed out that two other connections from the negative (—) side 21 of the direct current line to the cycle release bus bar, have been made as preliminary settings. These are (1), by way of the conductor 34a, the coil 28b, the spring contact member 28k, the contact member 28l and the conductor 21c to the negative side 21 of the direct current line; and (2), from the negative (—) side 21 of the direct current line by the conductor 21g, the armature 35c, the contact point 35e, the coil 35a, and the conductor 34b to the cycle release bus bar 34.

From the foregoing, it is clear that with the connection between the swinging contact member 37 and the contact member 37b, a connection is established for coils 28b and 35a across the direct current line.

This connection causes the energization of the coils 28b and 35a, and, as relay coils 28a and 35b are de-energized, a resultant return of the respective armatures 28c and 35c to their normal positions takes place as illustrated in Fig. 1. In the case of the relay 28, this action breaks all contacts previously made and leaves the parts as shown in Fig. 1.

From the above it is clear that the operation has been such that the relays 28, 35, 38, and 41 have been returned to their normal positions after operation. The relay 25 has not yet been returned to its normal position and the stylus 30 is still connected to the stylus bus bar 32 through conductor 29, contact members 25l, 25m, resistor 31r and conductor 32b, but is not making any marks as the connection between the 220 volt ungrounded bus bar 31 and the stylus 30 bus has been broken at contacts 28g and 28f. This status will continue to be until such time as the circuit breaker or another circuit breaker is again closed and the switch 20 disconnects contact members 20a and 20b and connects contact members 20a and 20c. When this takes place, the lamp 23 is lighted and the lamp 24 is shunted out.

In addition, since both terminals of relay coil 25a are connected to positive bus 22 by conductor 22b and 20a, 20c and conductor 22a, it is de-energized and the spring 25c moves the armature 25b to its normal position, illustrated in Fig. 1.

As the rod or bar 25d reaches its left hand position, the connections between the spring contact 25e and the contact member 25g and between the spring contact 25h and the contact member 25k are broken and contacts made between the spring contact member 25e and the contact member 25f and between the spring contact member 25h and the contact member 25j. This reversal of potential causes a charging current through the condenser 27 and the relay coil 28a and causes its operation to again move the armature 28c to the left. In this operation, however, only two of the three pairs of contacts are effective to produce any results—the connections between members 28h and 28j which connection is made for operation of the time stamp and between contacts 28k and 28l for connection to the relay 28b for the cycle release. While connections will be made between contact members 28f and 28g, these connections for the stylus power bus bar will not be effective because at this time, the armature 25d is at its left hand position as shown in Fig. 1 with no contact between the contact members 25l and 25m, and since contact between these contact members is necessary for the conduct of alternating current to the stylus 30, no action results from contact between the contact members 28f and 28g.

The operation of the rod or bar 28e to the left to close the contact between the contact members 28h and 28j, causes the operation of the time stamp already described, except at this time, the stamp indicates the closing of the circuit breaker or the return to normal of any other machine, mechanism or device, the functions of which are being recorded.

Except for the non-operation of the stylus to make dots on the record sheet, the other parts pass through a complete cycle in the same manner as previously described.

In inspecting the record sheet, the time stamp records are readily identified since the record starting time stamp will be at the beginning of the dot recordings while the closing time stamp will be at the end of such record, unless the breaker closes before the chart stops moving, in which case there will be no time stamp record for the closing as later described.

As there is one relay 25 and one relay 28 for each stylus and for each switch 20 and one switch 20 for each circuit breaker or other machine, mechanism or device, the operations of which are being recorded, it follows that the relay 28 and the relay 25 corresponding to one switch 20 may have their armatures in position corresponding to their switch 20 position while those of relays 28 and 25 corresponding to another switch 20 for another machine, mechanism or device may be in independent positions which correspond to the position of their switch 20.

From the foregoing description it may be seen that the energizing of any relay 25 causes its corresponding stylus to be connected to the stylus power bus 32 until such time as it is again de-energized.

The energizing or de-energizing of any relay 25 also causes operation of relay 28, feeding of a definite length of record sheet through the recorder, connection of the stylus power bus to the 220 volt power source and with one exception, the stamping of the time. Hence each time the paper moves all styli connected to an energized relay 25 will mark a dotted line. Thus each time a relay 25 operates, the time is recorded and a dotted line on the record sheet shows the position of every relay 25 connected to the recorder.

As has already been noted, under one condition the operation of a relay 25 does not cause operation of the time stamp. After operation of one relay 25 has started the revolution of the shaft 43, the time stamp cannot again operate until the cycle is completed. This is because the relay 38 is energized breaking the circuit to the platen solenoid 39b at contact 38e. This prevents the platen from striking the record chart while it is in motion and also prevents repetitive stamping of the time before the time stamp type have had an opportunity to indicate a change of time. In such a case the paper will always have moved some distance from the point where the time is stamped before the second stylus (say 30a) starts its line of dots.

It should also be noted that should the relay coil 25a be energized, reversing the position of armature 25b at any time the shaft 43 is revolving, the relay coil 28b will momentarily be energized. As the armature 28c is already in the energized position, the only effect of such an operation is to start or stop the line of dots being made by stylus 30, before the record sheet reaches the end of its cycle.

There is but one each of the record sheet 40, drive means therefor and the relays 35, 38, 41 and their connections.

The conductors from other switches 20, relays 25 and other styli as 30a, 30b, 30c, 30d, 30e, and 30f will all be connected to the same bus bars and to their respective terminals, contacts, conductors and condensers 27 in the manner already described and as fully understood by those skilled in the arts.

It is to be understood that all of the connections and apparatus to the left of the conductors 22d, 39c and 36, and including them, are for common use of the circuits for the several circuit breakers or other devices which may be used with this recording apparatus and consequently there is one set only of these connections and apparatus for the whole recorder.

It is to be understood also that all of the connections and apparatus to the right of and including the conductors 21b and 32c, are individual to the circuit breaker or other device with which this recorder is used. Consequently all of these connections and apparatus must be repeated for each circuit breaker or other device with which the recorder is used.

The connections to the ungrounded 220 v. A. C. line 31, the stylus power bus bar 32, the time stamp bus bar 33, the cycle release bus bar 34 and the 125 v. D. C. service lines 21 and 22 are made as shown.

In the foregoing description, the construction and operation of the mechanism for recording the operation of one mechanism, machine or device, as a circuit breaker, has been described. From the construction, it will be clear that even though the switch 20 corresponding to the stylus 30 is operated to cause the stylus 30 to make a record, a similar stylus as 30a may be caused to start recording by operation of a second switch 20 corresponding to and operated by a second machine, mechanism or device—as a circuit breaker. By comparing the dotted lines on the record sheet with the time stamp recordings it may be determined which breaker opened first and the relation between the two openings may be studied.

Assume a situation where the first switch 20 has been operated by its circuit breaker, and the circuit breaker remains in an "out" position longer than the time it takes for the shaft 43 to rotate. In this case, it is clear that while the first operated relay 25 may remain in an operated position—with the armature 25c in its right hand position, the alternating current will be disconnected from the stylus 30 at the end of the cycle which comes with the energization of the cycle release bus bar. This will, of course stop the stylus recording. Further, the movement of the record sheet is stopped.

This stopping of the recording after a predetermined time of operation of the one-revolution clutch 45 is brought about by several steps, one of which is the operation of the relay coil 28b to move the armature 28c to its normal inoperative position, as shown in Fig. 1. The stopping takes place when the cycle release bus bar shall have been energized by closing the cycle release circuit by the upward movement of the swinging contact member 37 to close contact with the contact member 37a. This takes place near the end of the revolution permitted by the one-revolution clutch 45. In this connection, it will be remembered that the relay coil 28a moves the armature to the left by the charging current through the 6 mfd. condenser 27 which movement closes the contact members 28k, 28l connecting the coil 28b to the cycle release bus bar 34 to prepare for reset operation when the contact is made between the swinging contact member 37 and the contact member 37a.

In case a second circuit breaker then opens causing closing of its switch 20 across the contact points 20a, 20c, its stylus as 30a, will at once take the 220 volts of alternating current from the ungrounded bus 31, through contact of its 28 relay to the stylus power bus and contacts of its relay 25.

As a second result, the stylus 30 will again be energized since the relay coil 25a corresponding to the first switch 20 is still connecting the stylus 30 to the now energized stylus power bus 32. And as the stylus 30a becomes connected to the stylus power bus 32 by the contact members of the relay coil 28a of the second circuit breaker, it follows that both the stylus 30 and the stylus 30a will begin at the same time to record and will continue until either (1) the relay coil 25a of any particular circuit is de-energized by operation of its switch 20 or (2) the shaft 43 makes its complete revolution and stops the recording of all styli by operation of the swinging contact member 37.

In the same way, if the preparatory settings of the closing of contact member 25l with contact member 25m have been maintained by the continued energization of both relay coils 25a and another—third—relay coil 25a is energized by a third switch 20, its stylus as 30b and all of the others corresponding to other machines, mechanisms or devices—as the circuit breakers, whose relay coils 25a are energized, will again start recording until stopped in one of two ways just set forth.

Thus, when one or more breakers may have been opened and not yet closed, the operation of an additional switch 20 by the opening of its breaker, will cause the styli of the previously opened breakers to again come into operation for the period of the cycle initiated by the latest opened breaker. And because of this, it is possible, as above pointed out, to determine from a study of the record sheet, how many and which circuit breakers were open at the same time and at any given time and also the relation between their times of opening.

And this is true even though the time of being open may be only a split second—in which case the dots may be counted or the length of dotted lines measured to obtain the exact times.

It is to be noted that since the starting of a cycle by the switch 20, will cause the shaft 43 to make a full revolution, the same switch 20 may open and close two or more times during the second or other predetermined time which it takes the shaft 43 to revolve. In such a case, the spacing of the dots of the line—indicated by the time when the breaker may have been closed—and the number of dots made will give full information on the time the breaker will be out, it being remembered that the beginning of each cycle, whether it correspond to a circuit breaker opening or closing is marked with a time stamp record, but that after a cycle has been started no further time stamp record will appear until that cycle is completed and another started.

It is also evident that since the starting of a cycle by the switch 20, will cause the shaft 43 to make a full revolution, a second switch 20 may also open or close one or more times before shaft 43 ceases revolving. The result of this is that stylus 30a corresponding to the second switch 20 will make an interrupted line of dots, similar to that just described for stylus 30.

In the foregoing description, there have been described several different types of operation: where one circuit breaker opens and within a second of time, a second circuit breaker opens, the first one still causing a record to be made and also an operation where the dotted line, as for one second, had been completed prior to the opening of the second circuit breaker but before the closing of the first circuit breaker. Also, there has been described an operation where one or more breakers may open and close—all in one second or such predetermined time as may be found desirable to have the shaft 43 revolve.

One type of operation is where the first circuit breaker may open causing the switch 20 to start the operation hereinbefore described and causing the time to be printed on the margin of the chart and causing stylus 30 to start making a dotted line as already set forth. After the first stylus 30, for example, has been recording for ¼ of a second, another circuit breaker opening will likewise cause the stylus 30a to begin making a dotted line. If, after being in operation ½ second, the first circuit breaker whose operation is recorded by the stylus 30, should close, the operation of its switch 20 to de-energize the relay coil 25a, will stop recording by the stylus 30.

This closing of the first circuit breaker will not, however, stop recording of the second stylus 30a which will continue until the end of the second or such predetermined time as the shaft 43 may be set to revolve in one cycle. In an operation such as has just been described, assuming a record sheet travel of 3 inches per second, there will be a line of dots 1½ inches long in the path of the stylus 30 with no dots during the last part of the travel. In the line of travel of the stylus 30a, there will be no dots during the first ¼ of the sheet travel or ¾ inch and a line of dots 1¼ inches long during the last part of the second of travel. From inspection of this record, it may be readily seen that both circuit breakers will have been open at the same period for ¼ second as indicated by the over-lapping of the dotted lines, which would be interpreted as follows: The date, hour, minutes and seconds that the first breaker opened will be printed by the time stamp. The second breaker will have opened ¼ second later than the recorded time. The first breaker will have closed ½ second after the recorded time. The second breaker will still be open one second after the recorded time and its closure later would be indicated in another cycle.

In the example just described, the first circuit breaker might have closed ¼ second after it opened while the second circuit breaker might have opened ½ second after the first circuit breaker opened. In such a case, the stylus 30 would have marked a line of dots for the first ¾ inch, indicating ¼ second, and no line for the final 2¼ inches or ¾ second. And while the movement was going on, the stylus 30a would have been marked no line for the first 1½ inches, or ½ second, and a dotted line for the last 1½ inches, or ½ second.

Figure 2:
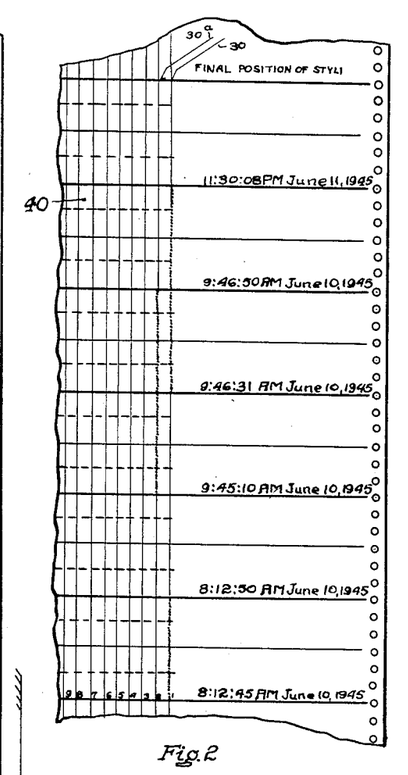
Fig. 2, 3, and 4 are illustrations of the record sheet showing different sets of recordings.

In Fig. 2, which is an illustration of a record sheet, there is represented the record of the opening and closing of two circuit breakers, No. 1 breaker record being next to the dating column and the record of No. 2 breaker adjacent thereto. In this figure, dots are used for the illustration but for the sake of clearness of illustration, no attempt is made to illustrate the 120 dots which would be made per second (three inches of record travel) during operation of the shaft 43 with a circuit breaker open.

Figure 3:
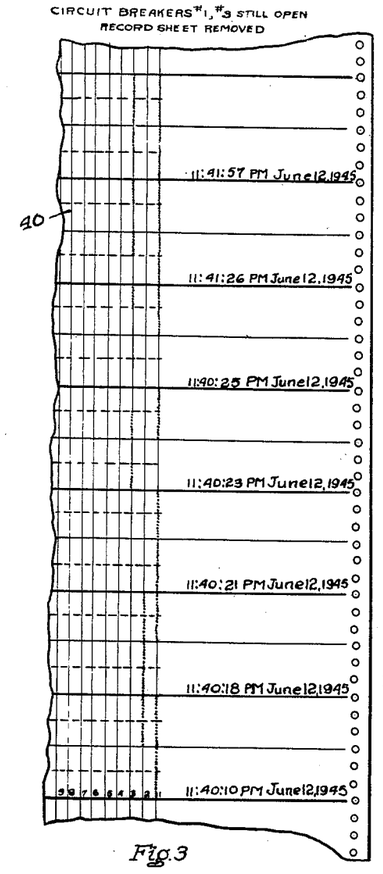

In order to understand the recordings on the record sheet, the following analyses are made of the recordings for these breakers. It is to be understood that the record sheet 40 travels from top to bottom, as illustrated, the styli remaining in their respective positions. The record sheet 40, Fig. 1 shows:

Fig. 2:
    Circuit Breaker No. 1—
        Open June 10, 1945—8:12:45 a. m.
        Closed June 10, 1945—8:12:50 a. m.
            Open interval—5 seconds
        Open June 10, 1945—9:46:31 a. m.
        Closed June 11, 1945—11:30:08 p. m.
            Open interval 37 hours, 43 minutes, 37 seconds
    Circuit Breaker No. 2—
        Open June 10, 1945—9:45:10 a. m.
        Closed June 10, 1945—9:46:50 a. m.
            Open interval 1 minute, 40 seconds Turning now to Fig. 3 where records of three circuit breakers are recorded, we find the following record:

Fig. 3:
    Circuit Breaker No. 1—
        Open June 12, 1945—11:40:10 p. m.
        Closed June 12, 1945—11:40:18 p. m.
            Open interval—8 seconds
        Open June 12, 1945—11:40:18½ p. m.
        Closed June 12, 1945—11:40:23 p. m.
            Open interval—4½ seconds
        Open June 12, 1945—11:40:23½ p. m.
        Closed June 12, 1945—11:40:25 p. m.
            Open interval—1½ seconds
        Open June 12, 1945—11:41:25½ p. m.
            Still open when record sheet was removed.
    Circuit Breaker No. 2—
        Open June 12, 1945—11:40:10½ p. m.
        Closed June 12, 1945—11:40:21 p. m.
            Open interval—10½ seconds
    Circuit Breaker No. 3 (automatically closed)—
        Open June 12, 1945—11:40:23 p. m.
        Closed June 12, 1945—11:40:23¼ p. m.
            Open interval—¼ second
        Open June 12, 1945—11:40:23½ p. m.
            Closed interval—¼ second
        Closed June 12, 1945—11:40:23¾ p. m.
            Open interval—¼ second
        Open June 12, 1945—11:40:25¾ p. m.
            Closed interval—2 seconds
        Closed June 12, 1945—11:41:26 p. m.
            Open interval—¼ second
        Opened June 12, 1945—11:41:26¼ p. m.
            Closed interval—¼ second
        Closed June 12, 1945—11:41:26½ p. m.
            Open interval—¼ second
        Open June 12, 1945—11:41:26¾ p. m.
            Closed interval—¼ second
        Closed June 12, 1945—11:41:57 p. m.
            Open interval—30¼ seconds
        Open June 12, 1945—11:41:57¼ p. m.
            Closed interval—¼ second
            Still open when record sheet removed.

Figure 4:
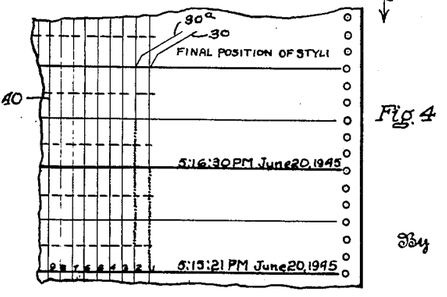

Referring now to Fig. 4 where records of circuit breakers No. 1 and No. 2 are recorded, we find:

Fig. 4:
    Circuit Breaker No. 1—
        Open June 20, 1945—5:15:21 p. m.
        Closed June 20, 1945—5:16:30 p. m.
            Open interval—1 minute, 9 seconds
    Circuit Breaker No. 2—
        Open June 20, 1945—5:15:21¼ p. m.
        Closed June 20, 1945—5:16:30½
            Open interval—1 minute 9¼ seconds After closing of No. 2 circuit breaker, record sheet traveled ½ second, 1½ inches to final position as indicated in Fig. 4.

In computing intervals of time with this invention, it is to be noted that for times over one second, there may be an error. This is due to the fact that the time clock is set to stamp times in intervals of one second, with the equipment described. Times for less than one second will be determined by the number of dots in the dotted lines made by the styli as already described.

The details of the time clock used, which are well known in the art, involves the advance of the clock type wheels, so as to indicate a second of change, as each second passes. It is thus obvious that the type wheel might type 11:40:21, indicating the time as forty minutes and 21 seconds past eleven; when the actual time might be 11:40:21$\frac{9}{10}$. Thus the interval might have a $\frac{9}{10}$ second error. Thus the error is plus or minus one second for intervals over one second.

When, however, greater accuracy is desired, it is only necessary to change the drive gearing to have the shaft 43 move the record sheet, 2, 3 or $n$ seconds during one cycle of record. In addition to this a clock may be employed which will record times of shorter interval, thus further reducing possible error.

Conversely, if less accuracy is desired, the time clock may print time at greater intervals than one second and the record sheet speed can be adjusted to run through as much length as desired during the interval selected. It has been found in practice, however, that with record sheet speeds running at less than 3 inches per second, 60 cycle alternating current will not produce distinct dots and lengths of lines must be used for determining fractional parts of the interval.

It thus appears that the amount of detailed information printed by the time stamp and its accuracy will be determined by the needs of the particular use to which the recording device is put.

In predetermining the speed of travel of the shaft 43 to advance the record sheet at the desired speed, the diameter of the roll over which the sheet is driven, the diameters of the gears connecting the constantly driven power motor with the one-revolution clutch 45 and the speed of the motor may all be varied to bring about the results sought.

From the foregoing description it is clear that the real purpose of the switch 20 is to cause energization and de-energization of the relay 25. The red light 23 and the green light 24 are mere convenient indicating means to give information to the operative as to what is taking or has taken place. It is therefore clear that if the conductor 22a became broken or was omitted and the two lamps 23 and 24 were either removed or omitted, the operation of the circuits and devices connected thereto would still be as described. In other words, if a single-throw switch should replace the double-throw switch 20 and its connection was only to the point 20b to operate the relay coil 25a, with no indicating lights 23, 24, the functions of the several parts would still be retained.

It is to be also understood that the relay 38 and its coils, contact members and connections and the condenser 38d may be an integral part of the time stamp as marketed and the capacity of the condenser 38d would be determined by the manufacturer so as to properly function with the coacting parts of the device.

To one familiar with the art it will be clear that there can be many control circuits made which will cause the several items of equipment to properly perform their respective functions. While all of those cannot be enumerated, it is obvious to those skilled in the art that that part of the circuit through the armature 35c, contact 35f, conductor 35h and condenser 35g is not essential to the operation, but is provided as a safeguard in case the relay coil 38a fails to function properly. The conductor 38b could be connected directly to the conductor 21g and the relay 35 with the connections 34b, 35k, 36, 23b and the contact member 37a eliminated.

It will be further clear to those skilled in the art that if direct current is not available from service lines the direct current coils heretofore described may be energized from a rectifier of suitable type which may be provided to give a direct pulsating current for the relays as shown and described.

If desired, direct current may be substituted for the alternating current, in which case, the record line on the record sheet, instead of being made by dots would be continuous and the length of the line instead of the number of dots would indicate the time.

One of the important features of the invention, it is now believed to be clear, is the co-ordinated action between the means for causing simultaneously (1) the printing of the time by the time stamp, (2) the commencement of the short but continuous record at the beginning of the cycle, which is accurate to 1/120 of a second and (3) the starting of the record so that the stylus, by the number of alternating current dots or by the length of a line made by direct current, may indicate the length of time, for example, the circuit breaker opened and the length of time it was open if it was open less than one second. This non-continuous use of the record sheet advancing at high speed during long periods of time when, for example, a circuit breaker may be open, results in a great saving of record sheet material.

In the claims, the terms "device" and "devices" are used. These terms refer to any of the mechanisms, machines or devices in connection with which this recorder is used and is intended to be a term broad enough to include any such mechanism, machine or device, the time of functioning of which it may be desired to record.

While one embodiment of this invention has been described and illustrated in detail, and in connection with recording the operations of an electric current circuit breaker as an outside agency, it is to be understood that the disclosures as to structure and coactive use are merely illustrative and that many other or equivalent dependent control means for bringing about the desired results, with the same or different wiring may be used and that the outside agency may be any activating machine, mechanism or device, the operation of which it is desired to record, whether it uses as a control element, mechanical, electrical, electronic, thermal, chemical or light affected means, any and all without departing from the spirit of the invention and within its scope as claimed.

Having described my invention, what I claim is:

1. A recording device comprising a means for supporting a record surface, means in position to make a record on the surface during movement of the surface relatively thereto, means for causing relative movement between the record making means and the surface, a time recording device in position to make a record on the record surface and means for simultaneously starting the relative movement, the recording by the record making means and causing the operation of the time stamp to record the time on the surface, when acted upon by an outside device, the time of operation of which is to be recorded.

2. A recording device comprising a means for supporting a record surface, means in position to make a record on the surface during movement of the surface relatively thereto, means for causing relative movement between the record making means and the surface, a time recording device in position to make a record on the record surface, and means for simultaneously starting the relative movement for a predetermined period of time, the recording by the record making means and causing the operation of the time stamp to record the time on the surface, when acted upon by an outside device, the time of operation of which is to be recorded.

3. A recording device comprising a means for supporting a record surface, means in position to make a record on the surface during movement of the surface relatively thereto, means for causing relative movement between the record making means and the surface, a time recording device in position to make a record on the record surface, means for simultaneously starting the relative movement for a predetermined period of time, the recording by the record making means and causing the operation of the time stamp to record the time on the surface when acted upon by an outside device, the time of operation of which is to be recorded, the record making means including means for discontinuing and means for resuming the record making during the predetermined operating time, on appropriate action of the outside device and without interfering with the relative movement.

4. A recording device comprising a means for supporting a record surface, means in position to make a record on the surface during movement of the surface relatively thereto, means for causing relative movement between the record making means and the surface, a time recording device in position to make a record on the record surface, means for simultaneously causing the operation of the time stamp to record the time on the surface and starting the relative movement for a predetermined period of time, when said last named means is acted upon by an outside device, the time of operation of which is to be recorded, and supplemental means for causing the time stamp operating means to become operative to cause the time stamp to again operate when the outside device operates in a different predetermined manner.

5. A recording device comprising a means for supporting a record surface, means in position to make a record on the surface during movement of the surface relatively thereto, means for causing relative movement between the record making means and the surface, a time recording device in position to make a record on the record surface, means for simultaneously causing the operation of the time stamp to record the time on the surface and starting the relative movement for a predetermined period of time, when said last named means is acted upon by an outside device, the time of operation of which is to be recorded, and supplemental means for causing the time stamp operating means to become operative to cause the time stamp to again operate when the outside device operates in a different predetermined manner, independently of the operation of the relative movement causing means.

6. A recording device comprising a means for supporting a record surface, means in position to make a record on the surface during movement of the surface relatively thereto, means for causing relative movement between the record making means and the surface, a time recording device in position to make a record on the record surface, means for simultaneously causing the operation of the time stamp to record the time on the surface and starting the relative movement for a predetermined period of time, when said last named means is acted upon by an outside device, the time of operation of which is to be recorded, and supplemental means for causing the time stamp operating means to become operative to cause the time stamp to again operate when the outside device operates in a different predetermined manner and for preventing the operation of the time stamp on such operations of the outside device if the time since the operation of the stamp is less than the predetermined time of operation of relative record surface movements.

7. A recording device comprising a means for supporting a record sheet, means in position to make a record on the sheet during movement of the surface relatively thereto, means for causing relative movement between the record making means and the sheet, means connected to the record making means for causing it to make a predetermined number of recordings, per unit of time, on the record sheet, a time recording device in position to make a record on the record sheet and means, when acted upon by an outside device, the time of operation of which is to be recorded for simultaneously causing the operation of the time stamp to record the time on the record sheet, for starting the relative movement and for starting the operation of the record making means.

8. A recording device comprising a means for supporting a record sheet, means in position to make a record on the sheet during movement of the surface relatively thereto, means for causing relative movement between the record making means and the sheet, means connected to the record making means for causing it to make a predetermined number of recordings per unit of time, on the record sheet, a time recording device in position to make a record on the record sheet and means, when acted upon by an outside device, the time of operation of which is to be recorded, for simultaneously causing the operation of the time stamp to record the time on the record sheet, for starting the relative movement for a predetermined period of time, and for starting the operation of the record making means.

9. A recording device comprising a means for supporting a record surface, means in position to make a record on the surface during movement of the surface relatively thereto; means for causing relative movement between the record making means and the surface, a time recording device in position to make a record on the record surface, means for simultaneously starting the relative movement for a predetermined period of time, the recording by the record making means and causing the operation of the time stamp to record the time on the surface, when acted upon by an outside device, the time of operation of which is to be recorded, and means, when acted upon by the outside device during the predetermined time, to stop the operation of the recording means without stopping the movement and without operating the time stamp.

10. A recording device comprising a means for supporting a record surface, means in position to make a record on the surface during movement of the surface relatively thereto, means for causing relative movement between the record making means and the surface, a time recording device in position to make a record on the record surface, means for simultaneously operating the time stamp, starting the relative movement for a predetermined period of time and starting the record making means when acted upon by an outside device, the time of operation of which is to be recorded, and means, when operated upon by the outside device in another manner and subsequent to the expiration of the predetermined period of time, to operate the time stamp and start the relative movement for another predetermined period of time and without starting the operation of the record making means.

11. A recording device comprising a means for supporting a record sheet, means in position to and for making a record on the sheet during movement of the surface relatively thereto, means for causing relative movement between the record making means and the sheet, means connected to the record making means for causing it to make a predetermined number of dot-recordings per unit of time, on the record sheet, a time recording device in position to make a record on the record sheet and means, when acted upon by an outside device, the time of operation of which is to be recorded, for simultaneously causing the operation of the time stamp to record the time on the record sheet, for starting the relative movement for a predetermined time and for starting the operation of the record making means, and means for stopping relative movement of the record making means and sheet without action by the outside device.

12. A recording device comprising a surface, a record sheet thereon, means including a stylus in position to make a record on the sheet, a time recording device adjacent to the sheet and in position to record the time thereon, means for moving the sheet relative to the stylus and between the stylus and surface, and dependent controlling means in position to be placed in operation when acted upon by an outside device, the time of operation of which is to be recorded for operating the time recorder to record the time on the sheet, start the stylus recording and start the relative sheet moving means—all at substantially the same time.

13. A recording device comprising a surface, a record sheet thereon, means including a stylus in position to make a record on the sheet, a time recording device adjacent to the sheet and in position to record the time thereon, means for moving the sheet relative to the stylus and between the stylus and surface, and dependent controlling means in position to be placed in operation when acted upon by an outside device, the time of operation of which is to be recorded for operating the time recorder to record the time on the sheet, start the stylus recording and start the relative sheet moving means, and means for stopping the relative movement at a predetermined relative time, all at substantially the same time.

14. A recording device comprising a means for supporting a record surface, a plurality of means in position to make a plurality of records on the record surface during movement of the surface relatively thereto, means for causing relative movement between the record making means and the record surface when acted upon by an outside device, the time of operation of which is to be recorded, a time recording device in position to make a record on the record surface and means for causing its operation at the starting of any record by a record making means and means for preventing the operation of the time stamp to indicate the time of starting of a recording by a record making means when the means for causing relative movement of the record is in operation at the time of starting of operation of the record making means.

15. A recording device comprising a means for supporting a record surface, a plurality of means in position to make a plurality of records on the record surface during movement of the surface relatively thereto, means for causing relative movement for a predetermined time, between the record making means and the record surface when acted upon by one or more outside devices, the respective times of operation of which are to be recorded, a time recording device in position to make a record on the record surface, means for causing its operation simultaneously with the starting of the relative movement and means for starting the recording of any record making means upon operation of a corresponding outside device.

16. A recording device comprising a means for supporting a record surface, a plurality of means in position to make a plurality of records on the record surface during movement of the surface relatively thereto, means for causing relative movement for a predetermined time, between the record making means and the record surface when acted upon by one or more outside devices, the respective times of operation of which are to be recorded, a time recording device in position to make a record on the record surface, means for causing its operation simultaneously with the starting of the relative movement, means for starting the recording of any record making means upon operation of a corresponding outside device, and means for preventing the operation of the time stamp during the relative movement.

17. A recording device comprising a means for supporting a record surface, a plurality of means in position to make a plurality of records on the record surface during movement of the surface relatively thereto, means for causing relative movement for a predetermined time, between the record making means and the record surface when acted upon by one or more outside devices, the respective times of operation of which are to be recorded, a time recording device in position to make a record on the record surface, means for causing its operation simultaneously with the starting of the relative movement, means for starting the recording of any record making means upon operation of a corresponding outside device, and supplemental controlling means for causing operation of the time stamp on operation of one of the outside devices in another manner, when the operation of the outside device takes place during non-relative movement.

18. A recording device comprising a means for supporting a record surface, a plurality of means in position to make a plurality of records on the record surface during movement of the surface relatively thereto, means for causing relative movement for a predetermined time, between the record making means and the record surface when acted upon by one or more outside devices, the respective times of operation of which are to be recorded, a time recording device in position to make a record on the record surface, means for causing its operation simultaneously with the starting of the relative movement, means for starting the recording of any record making means upon operation of a corresponding outside device, and means for stopping the recording of all record making means when the relative movement stops.

19. A recording device comprising a means for supporting a record surface, a plurality of means in position to make a plurality of records on the record surface during movement of the surface relatively thereto, means for causing relative movement for a predetermined time, between the record making means and the record surface when acted upon by one or more outside devices, the respective times of operation of which are to be recorded, a time recording device in position to make a record on the record surface, means for causing its operation simultaneously with the starting of the relative movement, means for starting the recording of any record making means upon operation of a corresponding outside device and supplemental controlling means for causing the operation of the time recording device on operation of one of the outside devices in another manner when the operation of the outside device takes place during nonrelative movement and for preventing operation of the time stamp during relative movement.

20. A recording device comprising a means for supporting a record surface, a plurality of means in position to make a plurality of records on the record surface during movement of the surface relatively thereto, means for causing relative movement for a predetermined time, between the record making means and the record surface when acted upon by one or more outside devices, the respective times of operation of which are to be recorded, a time recording device in position to make a record on the record surface, means for causing its operation simultaneously with the starting of the relative movement, means for starting the recording of any record making means upon operation of a corresponding outside device, and means under control of the outside devices and connected to their respective record making means to stop the corresponding record making means, and controlling means for stopping all recording means not stopped by control of the outside devices and again starting them when any other record making device is started.

HOWARD A. HOLMES.

REFERENCES CITED

The following references are of record in the file of this patent:

UNITED STATES PATENTS

| Number | Name | Date |
| --- | --- | --- |
| 1,443,040 | Rebori | Jan. 23, 1923 |